United States Patent
Akerstrom et al.

(10) Patent No.: US 9,707,519 B2
(45) Date of Patent: Jul. 18, 2017

(54) CROSSFLOW FILTRATION CASSETTE HOLDER

(75) Inventors: Patrik Akerstrom, Uppsala (SE); Nirmal Kumar Thanikachalam, Bangalore (IN)

(73) Assignee: General Electric Company, Schenectady, NY (US)

( * ) Notice: Subject to any disclaimer, the term of this patent is extended or adjusted under 35 U.S.C. 154(b) by 722 days.

(21) Appl. No.: 14/113,460

(22) PCT Filed: Apr. 25, 2012

(86) PCT No.: PCT/SE2012/050433
§ 371 (c)(1),
(2), (4) Date: Oct. 23, 2013

(87) PCT Pub. No.: WO2012/148348
PCT Pub. Date: Nov. 1, 2012

(65) Prior Publication Data
US 2014/0042069 A1    Feb. 13, 2014

(30) Foreign Application Priority Data
Apr. 27, 2011    (SE) ...................................... 1150364

(51) Int. Cl.
*B01D 63/08* (2006.01)

(52) U.S. Cl.
CPC ......... *B01D 63/082* (2013.01); *B01D 63/081* (2013.01); *B01D 63/084* (2013.01); *B01D 2313/02* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 2,107,805 A | 2/1938 | Russell | |
| 4,115,274 A | 9/1978 | Boddeker et al. | |
| 4,430,218 A | 2/1984 | Perl et al. | |
| 7,635,426 B2 | 12/2009 | Weinstein et al. | |
| 8,177,974 B2 | 5/2012 | Hunt et al. | |
| 8,877,052 B2 | 11/2014 | Cirou et al. | |
| 2006/0032805 A1* | 2/2006 | Hildebrant ............. | B01D 25/21 210/228 |

FOREIGN PATENT DOCUMENTS

| | | |
|---|---|---|
| DE | 102006009804 | 9/2007 |
| EP | 1946825 | 7/2008 |
| EP | 1844846 B1 | 2/2012 |
| GB | 2080144 | 2/1982 |
| WO | WO2010/092612 A1 * | 8/2010 |
| WO | WO 2010/151212 | 12/2010 |

* cited by examiner

Primary Examiner — Thomas M Lithgow

(57) ABSTRACT

A robust crossflow filtration cassette holder, allowing easy mounting and removal of filtration cassettes. The cassette holder comprises a distributor plate, an end-plate, a plurality of essentially parallel tie rods connecting the distributor plate with the end-plate, and a compression plate slidably mounted on the tie rods between the distributor plate and the end plate, wherein at least one of the tie rods is movable in its entirety between an open position or orientation, allowing mounting or removal of a filtration cassette, and a closed position or orientation, in which the movable tie rod is in engaged connection with the cassette and locks it in the holder by a locking means.

17 Claims, 6 Drawing Sheets

CROSSFLOW FILTRATION CASSETTE HOLDER

CROSS-REFERENCE TO RELATED APPLICATIONS

This application is a filing under 35 U.S.C. 371 of international application number PCT/SE2012/050433, filed Apr. 25, 2012, published on Nov. 1, 2012 as WO 2012/148348, which claims priority to patent application number 1150364-6 filed in Sweden on Apr. 27, 2011.

TECHNICAL FIELD OF THE INVENTION

The present invention relates to crossflow filtration and more particularly to a crossflow filtration cassette holder for use in bioprocess separations.

BACKGROUND OF THE INVENTION

For the separation of suspended solids or dissolved macromolecules from a fluid by filtration, two basic configurations are used, direct-flow filtration (also called normal flow filtration) and crossflow filtration (also called tangential flow filtration).

In direct-flow filtration, fluid is introduced perpendicularly to the filter surface and then passes directly through the filter.

In crossflow filtration, on the other hand, a fluid flow is passed tangentially along the filter surface. Particles/molecules smaller than the pore size of the filter pass through the membrane as a permeate (filtrate), while everything else is retained on the feed side of the membrane as a retentate. Usually the fluid flow is recirculated across the filter surface. Since the retained products are swept along the surface by the tangential flow and do not build up at the filter surface as in direct-flow filtration, a crossflow filter can operate continuously at relatively high solids loads without being blocked by solids material.

A crossflow filtration system typically includes a filtration module, a feed tank, a pump for feeding liquid from the feed tank to the filtration module via a feed line, a return line for circulating retentate back to the feed tank, a valve in the retentate return line for applying pressure, and a permeate line for removing permeate from the filtration module.

Depending on the pore size of the filter, typically a membrane, crossflow filtration is classified as either a microfiltration (MF) or ultrafiltration (UF) process. Filter membranes are commonly configured as flat-sheet filter cassettes, which typically comprise a stacked assembly of porous membrane sheet components and permeate and retentate flow screen components, as described in e.g. US Pat. Appl. No. 2008/0264852 and U.S. Pat. No. 4,735,718. In a filtration module, several such filter cassettes are usually clamped together in a crossflow filtration cassette holder, as described in e.g. U.S. Pat. No. 7,635,426.

A crossflow filtration cassette holder typically includes a distributor plate, which has retentate and permeate inlet and outlet apertures in contact with the corresponding apertures on a cassette clamped towards the distributor plate. The retentate inlet apertures on the distributor plate are usually connected with a retentate inlet channel inside the plate, which ends in a retentate inlet connector. Similarly, the retentate outlet, the permeate inlet and the permeate outlet apertures are connected with the corresponding channels inside the plate, each ending in a connector. The distributor plate is joined to an end plate with tie rods, forming a cage-like structure within which a number of cassettes are placed with their apertures in registry and the tie rods engaging in indentations on the cassette sides to lock them in place. The cassette stack is then clamped to the distributor plate to obtain efficient sealing, e.g. by a compressor plate between the end plate and the cassette stack.

The assembly and disassembly of the holder can be time-consuming, involving the dismounting of the end plate from all the tie rods. An alternative is to include a hinged tie bar in the structure, which can be opened to allow mounting and removal of cassettes without disassembly of the holder. Such a solution is described in WO 2010/151212 FIG. 2. The hinged structure is however mechanically sensitive and expensive to manufacture and there is thus a need for an improved solution.

SUMMARY OF THE INVENTION

One aspect of the invention is to provide a robust crossflow filtration cassette holder allowing easy mounting and removal of the filtration cassettes. This is achieved with a cassette holder as defined in claim 1. One advantage is that cassettes can be mounted and dismounted without disassembly, while the construction is sturdy enough to withstand the high clamping forces needed to ensure complete sealing.

A further aspect of the invention is to provide a robust crossflow filtration module. This is achieved with a module as defined in claim 14. One advantage of the module is that cassettes can be mounted and dismounted without disassembly, while the construction is sturdy enough to withstand the high clamping forces needed to ensure complete sealing.

Another aspect of the invention is to provide a convenient method of mounting filtration cassettes in a crossflow filtration cassette holder. This is achieved with a method as described in claim 15.

Further suitable embodiments of the invention are described in the depending claims.

DETAILED DESCRIPTION OF EMBODIMENTS

Figure 1:
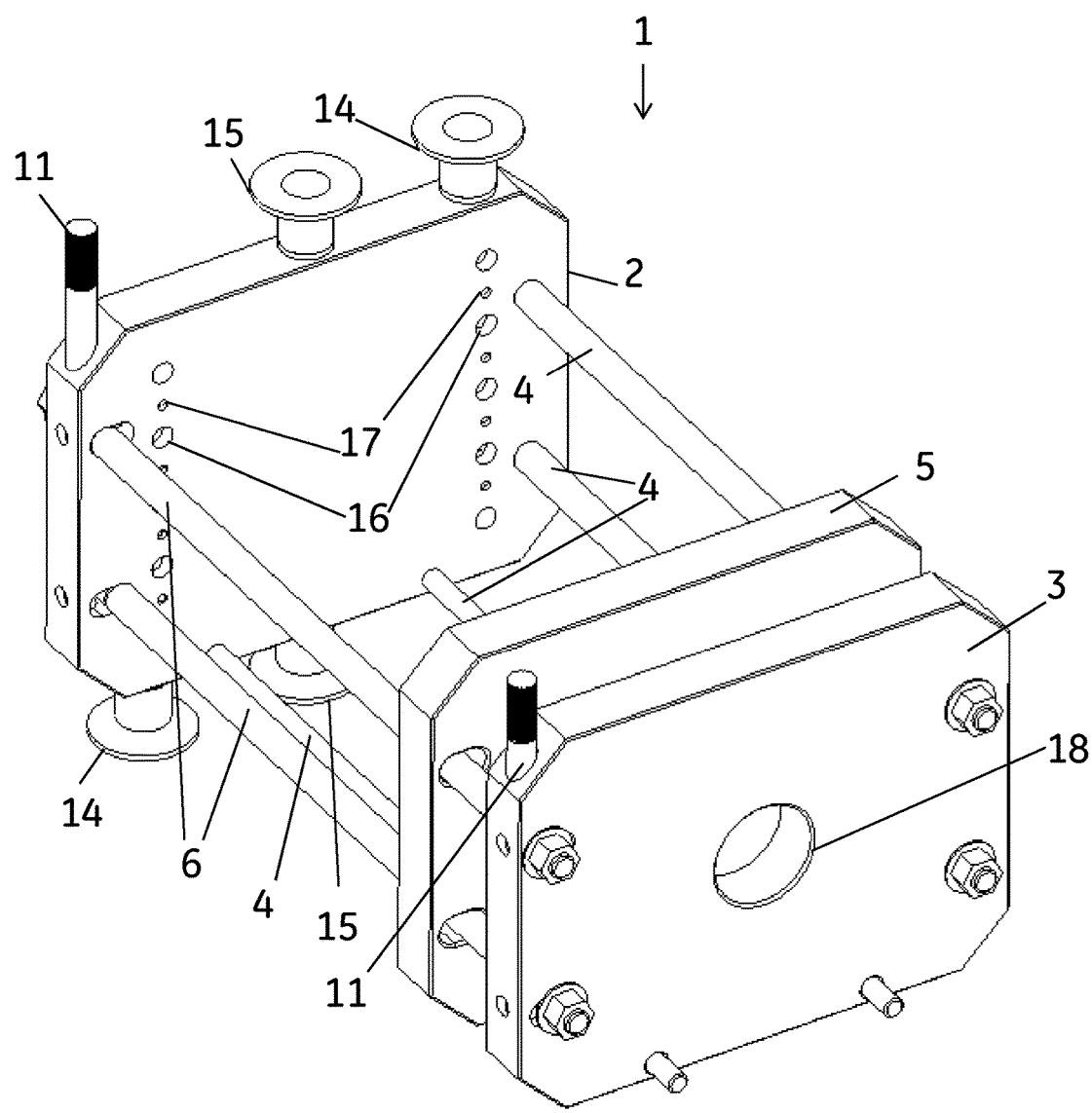
FIG. 1 shows a perspective view of an empty crossflow filtration cassette holder according to the invention.

In one aspect illustrated by FIGS. 1-5, the present invention discloses a crossflow filtration cassette holder 1; 31, which comprises a distributor plate 2; 32, an end-plate 3; 33, a plurality of essentially parallel tie rods 4,6; 34,36 which connect the distributor plate with the end-plate, and a compression plate 5; 35 which is slidably mounted on the tie rods between the distributor plate and the end plate. At least one 6; 36 of the tie rods 4,6; 34,36 can be moved in its entirety between a) an open position 7 or orientation 37, where it is possible to mount or remove one or more filtration cassettes 9; 39, and b) a closed position 8 or orientation 38, where the movable tie rod is in engaged connection with the cassette and locks it in the holder by a locking means 10; 40. The locking means can e.g. be one or more indentations 10; 40 on the cassette 9; 39, which are adapted to engage a movable tie rod 6; 36. When the movable tie rod or tie rods is/are in the open position/orientation, a cassette or a stack of cassettes can be placed between the tie rods in the cage structure formed by the tie rods and oriented so that the locking means are facing the movable tie rod or tie rods. When the movable tie rod or tie rods is/are moved to the closed position/orientation, the cassette or stack of cassettes is locked in place and prevented from movement in the plane perpendicular to the tie bars, which would cause leakage during use.

An advantage of the invention is that the cassette holder is easy to open without disassembling the tie bars and that the tie bars are robust enough to withstand the clamping force needed to ensure sealing. Typical clamping forces used with crossflow filtration cassettes can be in the range of 4-15 kN, depending on the liquid pressure (e.g. 0-4 bar) and the cross section area of the cassettes (e.g. 100-350 cm$^2$). When larger cassettes are used, the clamping force may be up to 30 kN. The clamping force is easily applied to the compression plate without disassembling the holder, which emphasizes the need for an easy method to mount and remove cassettes.

In certain embodiments the movable tie bar or tie bars 6; 36 can be formed as single piece constructions. An advantage of avoiding joints, hinges or similar weak elements in the tie bars is that their strength is increased and also that the risk of jamming due to e.g. corrosion or encrustation is diminished.

In some embodiments the plates 2,3,5; 32,33,35 and/or the tie bars 4,6; 34,36, including the movable tie bar or tie bars 6; 36, can comprise a ferrous metal such as stainless steel. Stainless steels, e.g. 316L and similar qualities are routinely used in bioprocess equipment and it is desirable to be able to use them also for the movable tie bars. If a hinged tie bar according to the prior art is used, the weakness of the hinge must be compensated by using high strength corrosion-resistant materials like titanium, which is highly expensive and also poses difficulties in machining.

In certain embodiments the movable tie rod or tie rods 6; 36 have a diameter less than about 20 mm, such as about 10-15 mm. The indentations 10; 40 on most commercially available filtration cassettes are accommodated to engage with tie rods of 10-15 mm, which sets a practical limitation on the rod diameters. For weight and cost reasons it is also desirable to use tie rods of diameters less than about 20 mm. An advantage of the tie rods of the invention is that even with limited rod diameters they still give sufficient strength to withstand the clamping force.

In some embodiments at least two 6; 36 of the tie rods 4,6; 34,36 are movable in their entirety between an open position or orientation and a closed position or orientation. For larger cassettes, with two or more indentations 10; 40 on each side, at least two tie rods should be movable to allow mounting and removal of the cassettes. For smaller cassettes, with just one indentation per side, one movable tie rod can be sufficient, although it is also possible to have two movable tie rods; one on each side of the cassette. In the latter case, an advantage of having tow movable tie rods is that the difference between closed and open position/orientation can be lower for each tie bar. This can allow for more convenient constructions.

In certain embodiments the distributor plate 2; 32 comprises retentate 14; 44 and permeate 15; 45 inlet and outlet connectors, which are fluidically connected with retentate 16 and permeate 17 apertures corresponding to apertures 10; 40 on a filtration cassette 9; 39. When a cassette or a stack of cassettes is mounted in the holder, it can be placed so that the apertures on the cassette(s) fit the apertures on the distributor plate and any further cassettes are stacked with their apertures in registry. Fluidically connected retentate and permeate loops are then formed to allow for crossflow filtration. It is also possible to use a distributor plate with retentate and permeate apertures on both sides of the plate. In this case, two end plates will be used, with one cassette or stack of cassettes between each end plate and the distributor plate. The retentate inlet may alternatively be called a feed inlet.

In some embodiments, the cassette holder 1; 31 also comprises compression means 49, which is arranged to act on the compression plate 5; 35. The compression means can e.g. comprise a hydraulic cylinder or one or more screws, bolts, threaded rods, cantilevers, excenter clamps etc. The compression means may act on the compression plate 5; 35 through an opening 18; 48 in the end plate 3; 33. The compression means can provide the clamping force needed to allow for leak-free connection between the cassettes and between the cassettes and the distribution plate.

Figure 2:
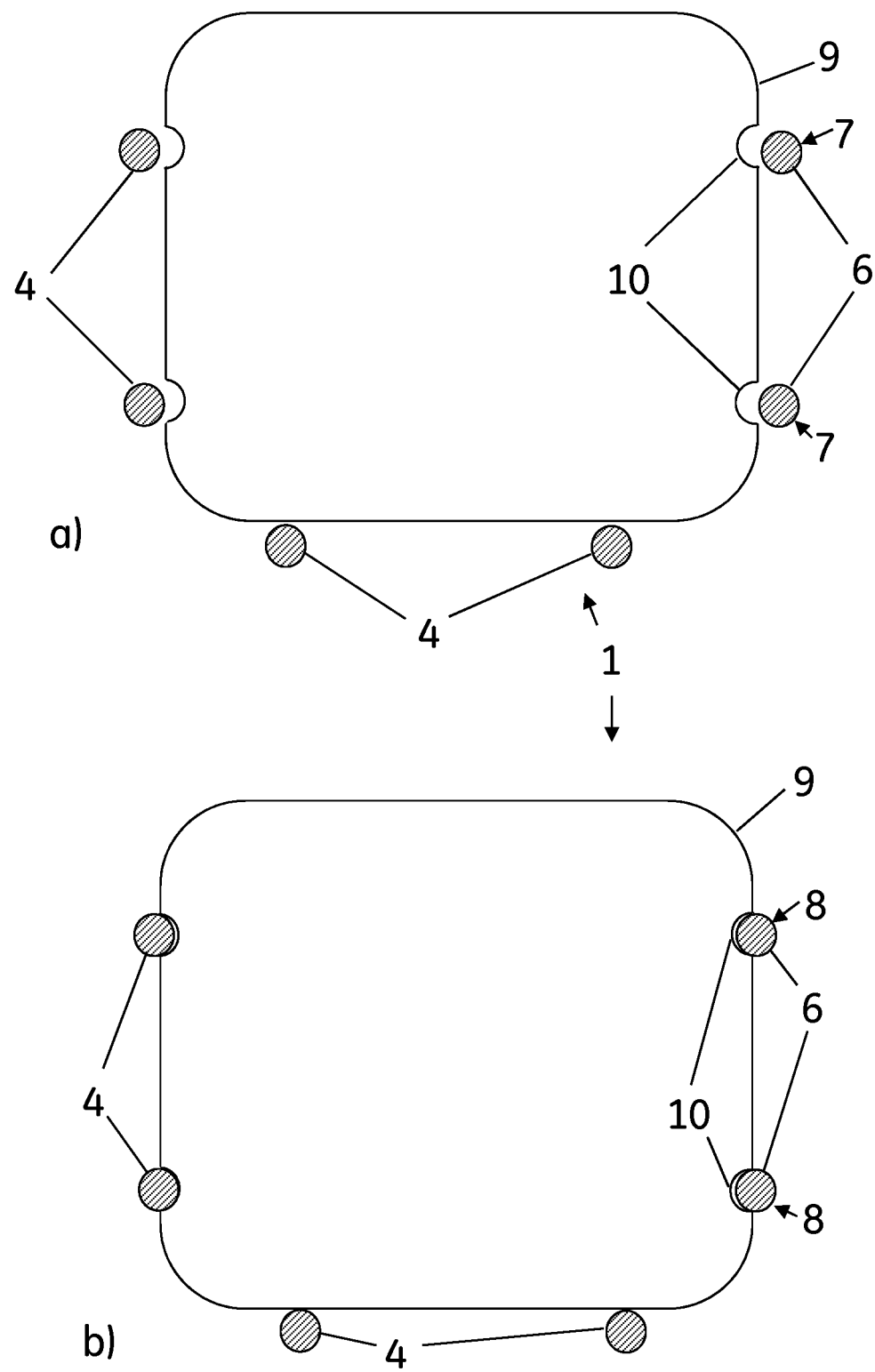
FIG. 2 shows a cross section of a cassette holder according to the invention with tie rods in a) open and b) closed position.
Figure 3:
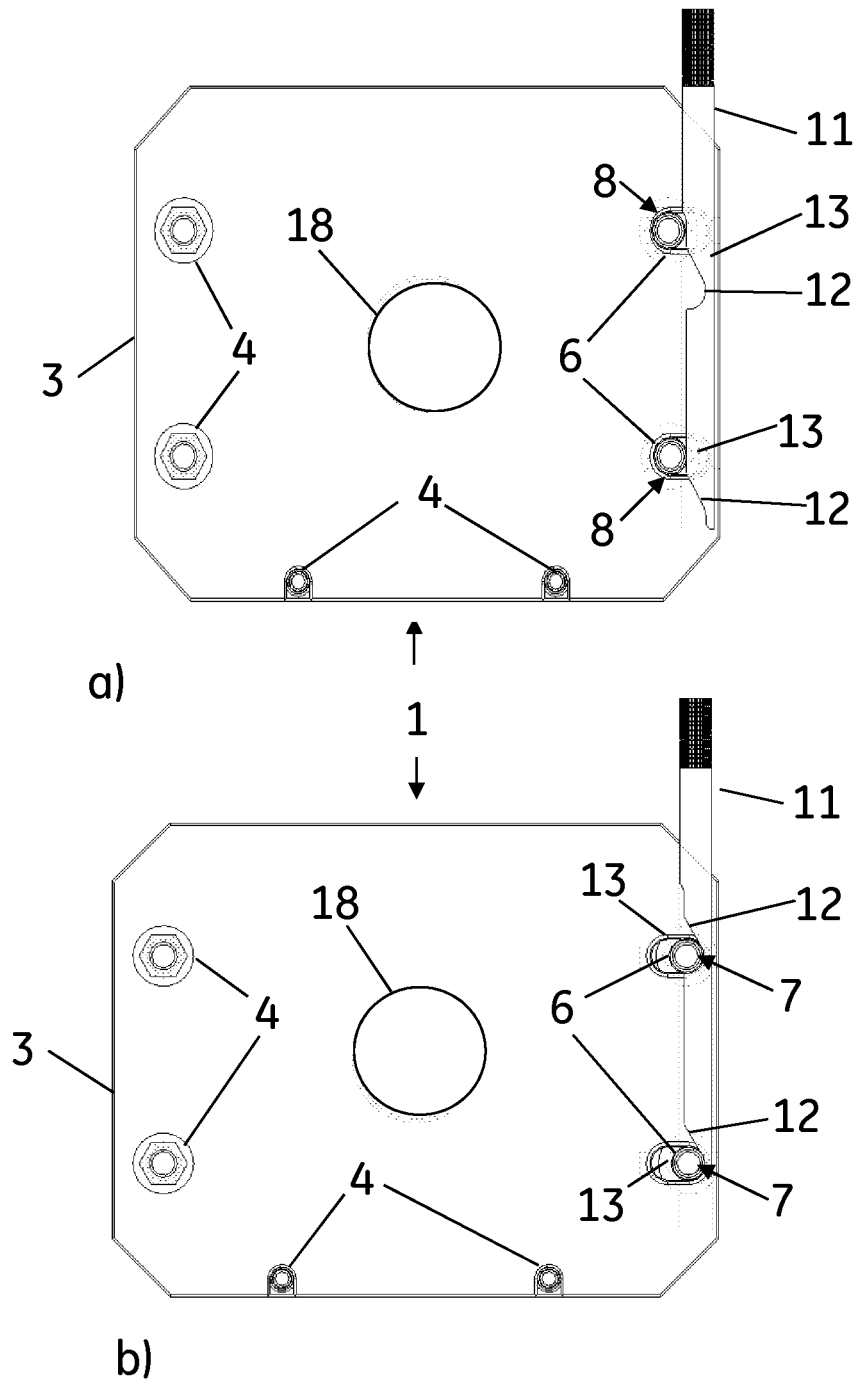
FIG. 3 shows an end view of a cassette holder according to the invention with pins and tie rods in a) closed and b) open position.

In certain embodiments, illustrated by FIGS. 1-3, the movable tie rod or tie rods 6 are laterally movable, i.e. in a plane essentially parallel to the distribution 2 and end 3 plates and/or essentially perpendicular to the length axes of the tie rods 4,6. They can be movable in a direction essentially towards and away from a cassette 9 placed in the holder 1. Such movement can e.g. be accomplished by having the ends of each movable tie rod 6 slidably connected to the end-plate 2 and the distributor plate 3, e.g. by mounting them through elongated openings 13 in the plates. The openings 13 can be elongated in a direction essentially towards and away from a cassette 9 placed in the holder, which allows the tie rod to slide in this direction. The movable tie rods can be spring loaded so that they can be moved by an external force and then return e.g. to the locked position through the action of a spring. The shape of the openings may e.g. be generally rectangular with two opposite ends capped by circle arcs such as hemicircles. The movable tie rods may be freely slidable when no clamping force is applied and locked in place when a compression means acts upon the compression plate.

In some embodiments, illustrated by FIGS. 1 and 3, the cassette holder 1 comprises pins 11 mounted in the distributor plate 2 and the end plate 3. These pins are arranged to move the laterally movable tie rod or tie rods 6 between an open 7 and a closed 8 position. The pins can comprise indentations 12 which engage with the laterally movable tie rod or tie rods 6. When the pins are pushed towards the plates 2,3, the movable tie rods move inwards to a closed position 8, although it is also possible to arrange the pins with the indentations and e.g. spring loaded tie bars so that the tie bars move outwards upon pushing the pins. It is also possible to arrange the pins 11 and the indentations 12 so that the tie bars 6 are laterally moved upon rotation of the pins 11.

Figure 4:
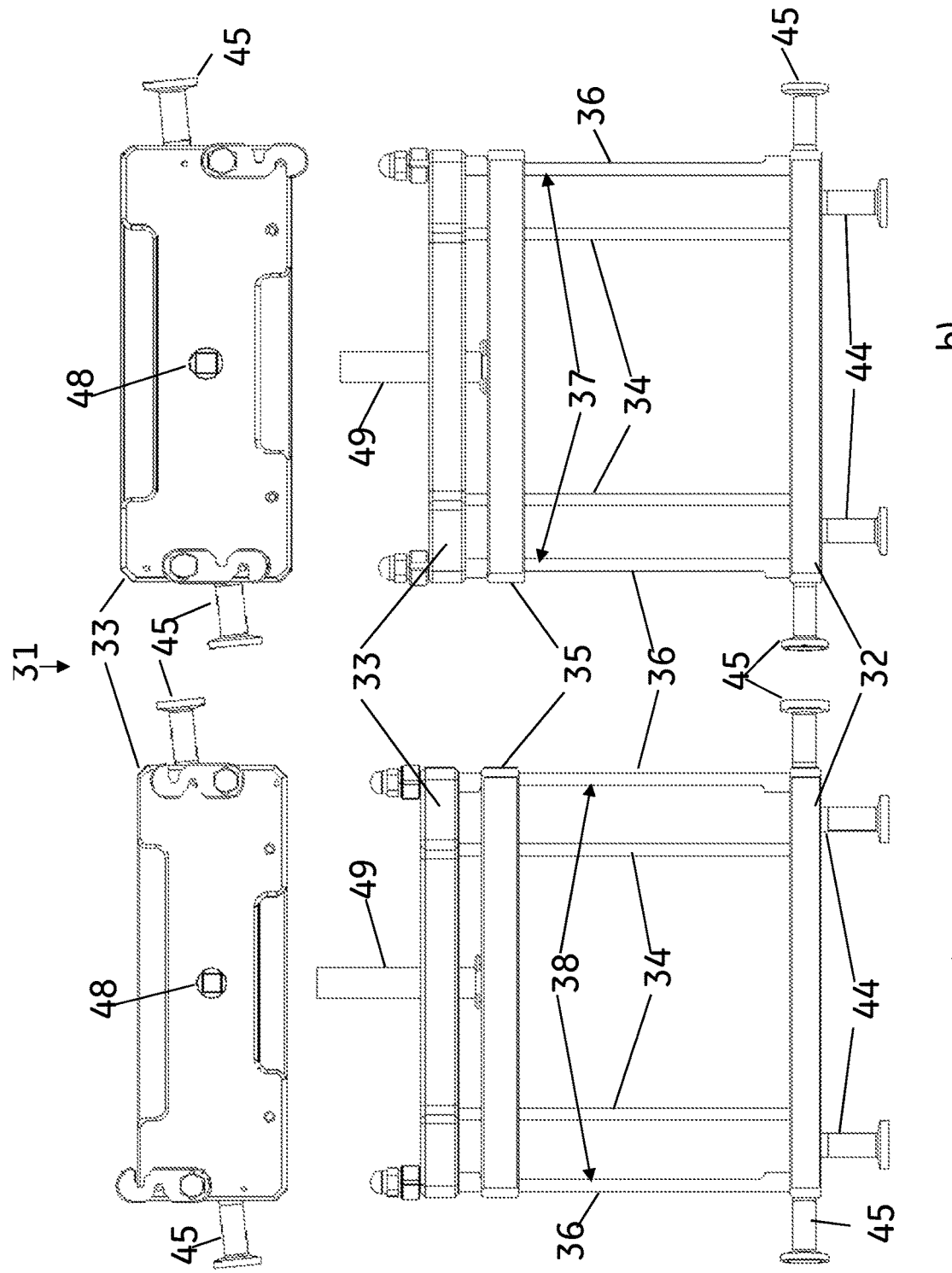
FIG. 4 shows top and side views of a cassette holder according to the invention with rotatable tie rods in a) closed and b) open orientation.
Figure 5:
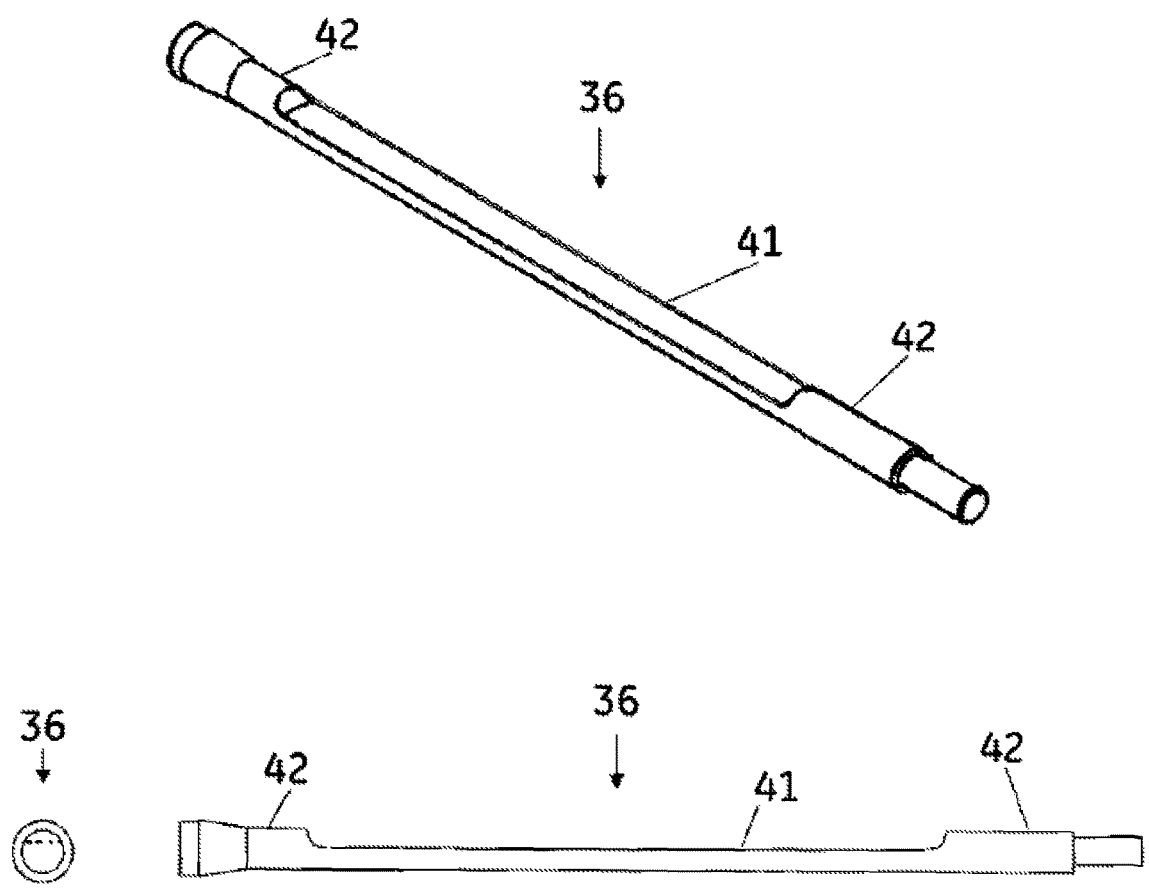
FIG. 5 shows a rotatable tie rod with truncated circle cross section in perspective and projection drawings.
Figure 6:
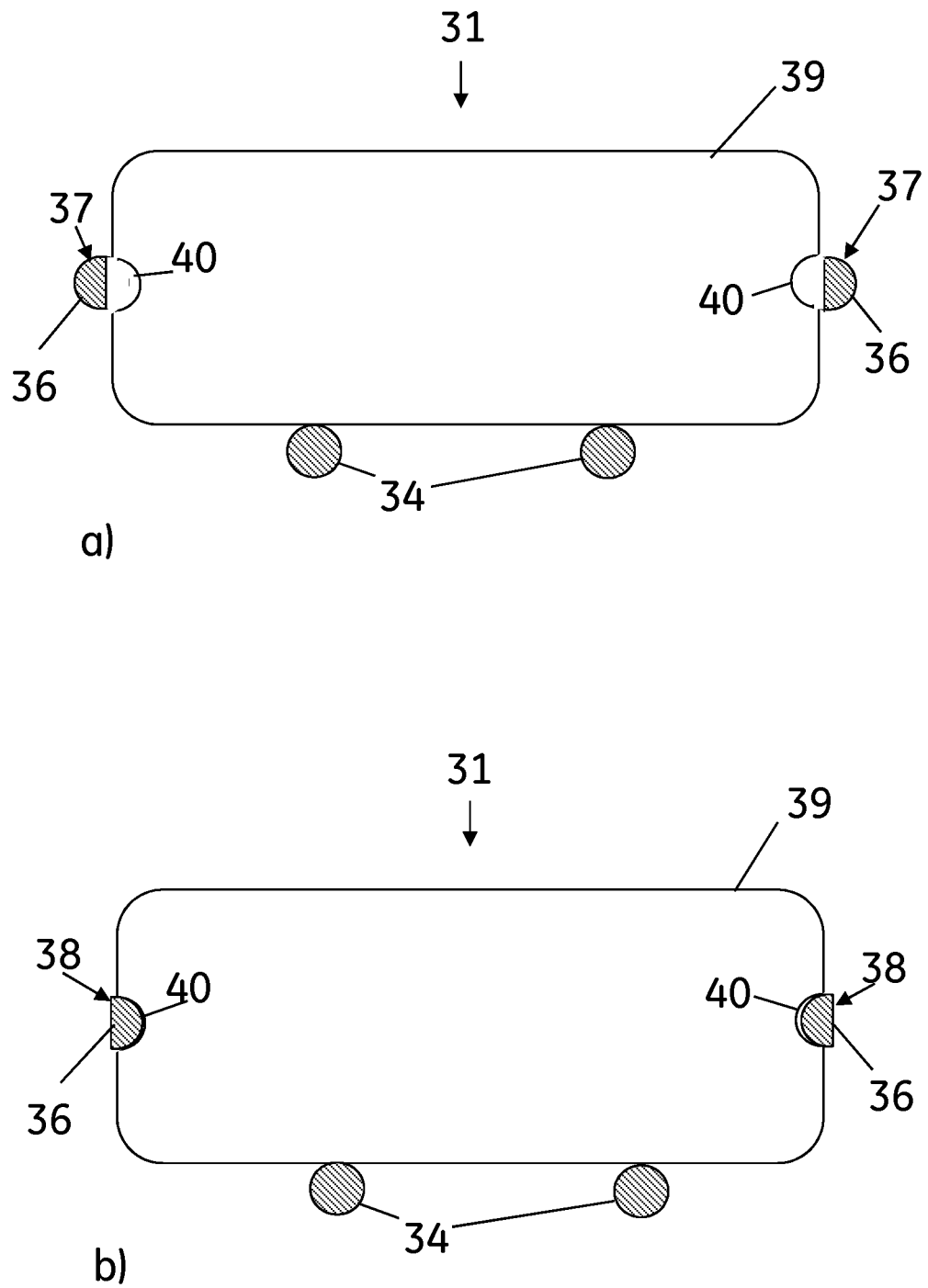
FIG. 6 shows a cross section of a cassette holder according to the invention with rotatable tie rods in a) open and b) closed orientation.

In certain embodiments, illustrated by FIGS. 4-6, the movable tie rod or tie rods 36 are mounted to be rotatable around their length axes. They can suitably have a circular cross section in the regions 42 contacting the distributor plate and the end plate and a truncated circle cross section in at least part of the region 41 between the distributor plate 32 and the end plate 33. They are then supported by the distributor and end plates and when they are rotated around the length axes, they move from an open orientation 37 where the truncated part of the circle faces the cassette to a closed orientation 38 where the circular arc faces the cassette and engages in a cassette indentation 40. The transition from circular to truncated circle cross section can be gradual, such as with a radius of curvature, to avoid local stress concentration when a clamping force is applied.

In one aspect, illustrated by FIGS. 1-6, the invention discloses a crossflow filtration module comprising a crossflow filtration cassette holder 1; 31 and at least one filtration cassette 9; 39 mounted in the holder. The holder can be constructed according to any of the embodiments described above and the module may comprise one cassette or a stacked plurality of cassettes. When the cassettes are locked in place by moving the movable tie bar or tie bars 6; 36 in their entirety to a closed position 8 or orientation 38, the module may be used for e.g. ultrafiltration or microfiltration of fluids in bioprocessing of e.g. biopharmaceuticals or other biomacromolecules. Examples of applications for such a module include buffer exchange by ultrafiltration in a diafiltration mode, concentration of protein solutions, removal of small molecule contaminants from proteins, vaccines etc and removal of particulates from protein solutions.

In one aspect, the invention discloses a method of mounting a filtration cassette 9; 39 in a crossflow filtration cassette holder 1; 31. The method comprises placing the cassette in the holder and moving at least one tie rod 6; 36 in its entirety from an open position 7 or orientation 37 to a closed position 8 or orientation 38 where the tie rod is in a locking engagement with the cassette. The holder can be constructed according to any of the embodiments described above. The method may also comprise a step of moving at least one tie rod in its entirety from a closed position or orientation to an open position or orientation, to be performed before placing the cassette in the holder.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A crossflow filtration cassette holder for holding a filtration cassette, comprising a distributor plate, an end-plate, a plurality of essentially parallel tie rods connecting said distributor plate with said end-plate, and a compression plate slidably mounted on said tie rods between said distributor plate and said end plate, wherein at least one of said tie rods is movable in its entirety between an open position or orientation allowing mounting or removal of the filtration cassette, and a closed position or orientation in which the at least one movable tie rod is in engaged connection with the cassette and locks it in the holder through a locking means on the cassette, wherein the locking means comprises at least one indentation on the cassette adapted to engage the at least one movable tie rod.

2. The crossflow filtration cassette holder of claim 1, wherein said movable tie rod is rotatable around its length axis, has a circular cross section in regions contacting the distributor plate and the end plate and has a truncated circle cross section in at least part of a region between the distributor plate and the end plate.

3. The crossflow filtration cassette holder of claim 1, wherein said movable tie rod is formed as a single piece.

4. The crossflow filtration cassette holder of claim 1, wherein said movable tie rod comprises a ferrous metal, such as stainless steel.

5. The crossflow filtration cassette holder of claim 1, wherein said movable tie rod has a diameter less than about 20 mm, such as about 10-15 mm.

6. The crossflow filtration cassette holder of claim 1, wherein at least two of said tie rods are movable in their entirety between an open position or orientation and a closed position or orientation.

7. The crossflow filtration cassette holder of claim 1, wherein said distributor plate comprises retentate and permeate inlet and outlet connectors fluidically connected with retentate and permeate apertures corresponding to apertures on the filtration cassette.

8. The crossflow filtration cassette holder of claim 1, further comprising compression means comprising a hydraulic cylinder or a screw, arranged to act on the compression plate.

9. The crossflow filtration cassette holder of claim 1, wherein said movable tie rod is laterally movable.

10. The crossflow filtration cassette holder of claim 9, wherein the ends of said movable tie rod are slidably connected to the end-plate and the distributor plate, such as through elongated openings in the plates.

11. The crossflow filtration cassette holder of claim 9, further comprising pins mounted in the distributor plate and the end plate, wherein said pins are arranged to move said laterally movable tie rod between the open and the closed position.

12. The crossflow filtration cassette holder of claim 11, wherein said pins comprise indentations engaging with said laterally movable tie rod.

13. A crossflow filtration module comprising the crossflow filtration cassette holder of claim 1 and at least one filtration cassette mounted in said holder.

14. A method of mounting a filtration cassette in the crossflow filtration cassette holder of claim 1, the method comprising placing the cassette in the holder and moving the at least one movable tie rod in its entirety from the open position or orientation to the closed position or orientation to have a locking engagement with the cassette.

15. A crossflow filtration cassette holder for holding a cassette, comprising a distributor plate, an end-plate, a plurality of essentially parallel tie rods connecting said distributor plate with said end-plate, pins mounted in the distributor plate and the end plate, and a compression plate slidably mounted on said tie rods between said distributor plate and said end plate, wherein at least one of said tie rods is laterally movable in its entirety between an open position or orientation allowing mounting or removal of the cassette, and a closed position or orientation in which the at least one movable tie rod is in engaged connection with the cassette and locks it in the holder through a locking means on the cassette, and wherein said pins are arranged to move said laterally movable tie rod between the open and the closed position.

16. The crossflow filtration cassette holder of claim 15, wherein said pins comprise indentations engaging with said laterally movable tie rod.

17. The crossflow filtration cassette holder of claim 15, wherein said movable tie rod is rotatable around its length axis, has a circular cross section in the regions contacting the distributor plate and the end plate and has a truncated circle cross section in at least part of a region between the distributor plate and the end plate.

\* \* \* \* \*